R. A. HOYLE.
APPARATUS FOR THE FUSION OF REFRACTORY MATERIALS.
APPLICATION FILED JULY 1, 1918.
1,314,871.
Patented Sept. 2, 1919.
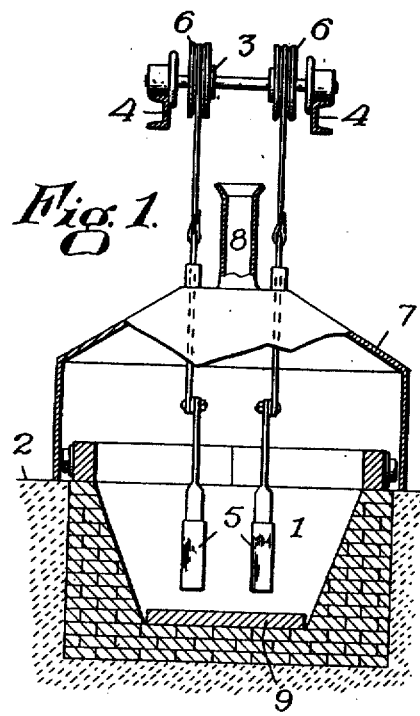
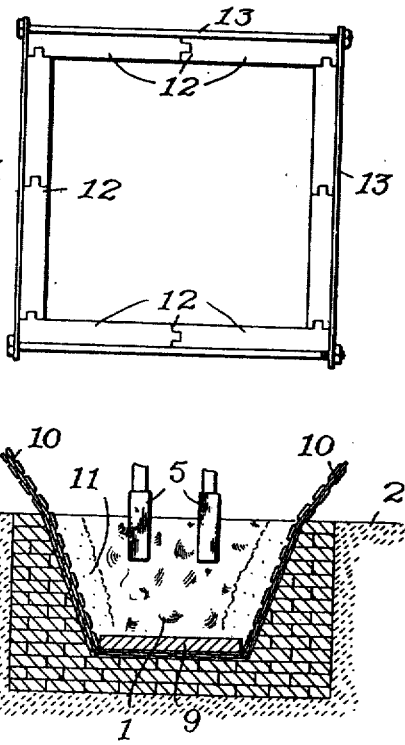
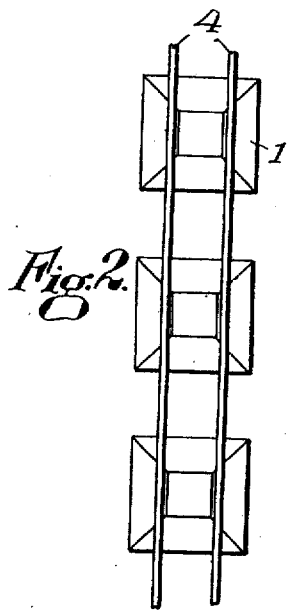
Inventor
Robt. A. Hoyle
By Attorney
Geo. H. Kennedy Jr.

UNITED STATES PATENT OFFICE.

RALPH A. HOYLE, OF WORCESTER, MASSACHUSETTS.

APPARATUS FOR THE FUSION OF REFRACTORY MATERIALS.

1,314,871.   Specification of Letters Patent.   Patented Sept. 2, 1919.

Application filed July 1, 1918. Serial No. 242,917.

*To all whom it may concern:*

Be it known that I, RALPH A. HOYLE, a citizen of the United States, residing at Worcester, in the county of Worcester and Commonwealth of Massachusetts, have invented a new and useful Improvement in Apparatus for the Fusion of Refractory Materials, of which the following, together with the accompanying drawings, is a specification.

The present invention relates to improvements in apparatus for the fusion of refractory materials and has particular reference to the provision of such apparatus as is suitable for use in the manufacture, for instance, of the artificial abrasive alundum, by the fusion of bauxite or the amorphous oxid of alumina.

The invention resides in a novel combination and arrangement of instrumentalities, as hereinafter set forth, by means of which the electric furnace method now in common use for the fusion of the above and similar ores is greatly simplified, and as a result of which, the initial cost of the apparatus used for procuring such fusion is greatly reduced. The invention is fully set forth and described hereinafter, and pointed out in the appended claims, reference being had to the accompanying drawings, in which—

Figure 1 is a sectional view of apparatus constituting my invention.

Fig. 2 is a plan view of such apparatus, and

Fig. 3 is an enlarged view illustrating certain devices used in connection with my apparatus.

Like reference characters refer to like parts in the different figures.

In the manufacture of alundum and other similar abrasives, as now practised, the ore which is to be fused is treated in an electric furnace of special and expensive construction, the same ordinarily comprising a shell, which, in some instances, may be lined with refractory material, and which frequently requires some provision for water cooling. The bottom of the crucible in such furnaces is made separable from the shell, in order to permit said shell to be lifted off, at the end of a run, to render the solidified charge readily removable. The electrodes in such furnaces are ordinarily suspended above the same and project into the shell; provision is made for raising and lowering the bottom or base of the crucible, which carries with it the removable shell, so that, as the charge in said shell is progressively melted, reduced, or otherwise treated, the entire crucible is lowered until the shell is full, or the run completed, thus bringing all parts of the charge into intimate contact with the electrodes.

According to the present invention, the necessity of providing expensive and complicated furnace installations, such as above described, is eliminated. As shown in the drawings, the mill floor is provided with a plurality of rows of suitably shaped pits 1, 1, the same extending to a depth of approximately three feet below the floor level 2. Each such pit 1, according to my invention, constitutes the crucible or pot of an electric furnace for the fusion of the desired charge, bauxite or the like. Associated with each row of pits 1, 1 is an overhead traveler 3, adapted to move on suitable tracks or ways 4, 4, and this traveler carries a set of electrodes 5, 5 which are thus made available for use, successively, with respect to all the pits 1, 1 in the row over which the traveler moves. Suitable devices 6 are provided on each traveler for raising and lowering electrodes 5, 5 with respect to the bottom of a pit 1. A hood 7, with suitable openings (not shown), for feeding the charge to each pit 1 and for observation, is provided to confine the gases resulting from the fusion of the charge and to direct their escape through the flue 8. Such a hood may, if desired, be carried by the traveler 3, and may be lowered into position over each pit 1 at the same time that the electrodes 5 are lowered into said pit.

The bottom of each pit is preferably constituted by a lining of carbon 9, and, as shown, at the right hand side of Fig. 1, provision may be made for disposing one or more chains 10 alongside the walls of the pit before the charge is fed in, the ends of said chain or chains projecting above the floor level 2.

The operation of the apparatus is as follows:—The first pit of a row is made ready for a run by disposing the chains 10 therein, after which the traveler 3 is moved along the ways 4 until it is directly above said pit. The electrodes 5 are lowered into the pit, and the hood is lowered to cover the pit, and the material to be treated is fed into the pit gradually and becomes fused or reduced to a molten mass by the action of the arc produced by said electrodes. The latter are gradually raised during this operation as more material is fed in on top of that which has become fused at the bottom. The material around the sides of the pit, at a distance somewhat remote from the arc, being of a refractory nature, is not fused in with the mass of material toward the center of the pit, but, on the other hand, serves as a lining for the molten mass, as shown at 11, Fig. 1, and thus protects the sides of the pit from the intense heat. As soon as fusion is completed in this first pit, the electrodes 5 and the hood 7 are moved over to the next succeeding pit in the row, where the operation above described is repeated, the molten mass in the first pit being left to cool. In this way there is no loss of time after each run such as occurs in the electric furnaces now in use for this purpose. When the molten mass in any pit has cooled and solidified, it is withdrawn by drawing up the chains 10, 10, so that the unfused material which served as a lining for the pit can be broken or chipped off, thus exposing the pig or mass of fused and hardened material produced by the operation above described.

Instead of using the chains 10 for the withdrawal of the pig or mass of fused material, as shown at the right hand side of Fig. 1, the devices shown at the left hand side of Fig. 1, and also in Fig. 3, may with advantage be employed. As indicated, the mouth of each pit 1 may be surrounded by a low wall of firebrick, or other refractory material, which wall is preferably composed of interlocking sections 12, 12, the structure thus assembled being temporarily held together by means of tie rods 13, 13. This wall constitutes a temporary extension of the pit 1 which enables a somewhat larger charge of the material to be fused therein. After a run is completed, the shallow wall is removed, either bodily or by loosening the tie rods 13, thus leaving a portion of the pig projecting above the mouth of the pit 1. This projecting portion of the pig serves as a hold for the removal of the entire pig from the pit, as will be readily understood. The sections 12, 12, being made interchangeable, can easily be replaced when burned out by the intense heat to which they are subjected during repeated runs.

I claim:

1. In apparatus of the class described, the combination with a row of alined depressions or pits, of a single overhead traveler associated therewith, electrodes carried by said traveler, and means for raising and lowering said electrodes with respect to the bottom of each pit over which said traveler is disposed.

2. In apparatus of the class described, the combination with a row of alined depressions or pits, of a single overhead traveler associated therewith, means for moving said traveler into position over successive pits of said row, electrodes carried by said traveler, and means for raising and lowering said electrodes with respect to the bottom of each pit over which said traveler is disposed.

3. In apparatus of the class described, the combination with a row of alined depressions or pits, of a single overhead traveler associated therewith, a hood carried by said traveler and adapted to cover one of said pits, electrodes carried by said traveler, and means for raising and lowering said electrodes with respect to the bottom of each pit over which said traveler is disposed.

4. In an apparatus of the class described, the combination with a row of alined depressions, or pits, of an overhead traveler associated therewith, a hood carried by said traveler, and means for raising and lowering said hood to successively cover said pits.

5. In apparatus of the class described, the combination with a depression below the ground level constituting a receptacle for material to be fused, of a removable bottom for said depression, and means extending below said bottom and terminating above the ground level for removing the fused material from said receptacle.

6. In apparatus of the class described, the combination with a depression below the ground level constituting a receptacle for the material to be fused, of means surrounding the mouth of said depression and serving as an extension thereof, said means being removable, whereby to leave the fused material projecting above the mouth of said depression.

RALPH A. HOYLE.

Witnesses:
NELLIE WHALEN,
PENELOPE COMBERBACH.